F. A. LYNCH.
LOCK NUT.
APPLICATION FILED APR. 4, 1917.
1,245,362.
Patented Nov. 6, 1917.
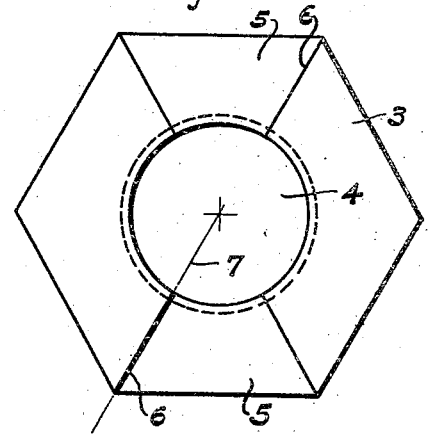
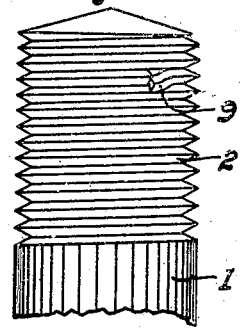
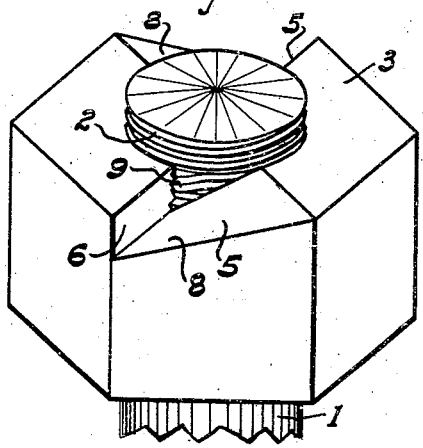
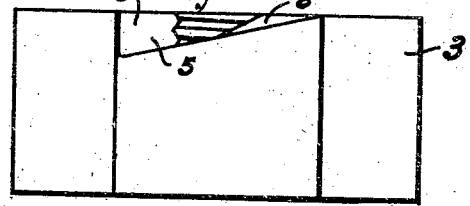

UNITED STATES PATENT OFFICE.

FRANK A. LYNCH, OF ROANOKE, VIRGINIA.

LOCK-NUT.

1,245,362. Specification of Letters Patent. Patented Nov. 6, 1917.

Application filed April 4, 1917. Serial No. 159,626.

*To all whom it may concern:*

Be it known that I, FRANK A. LYNCH, a citizen of the United States, residing at Roanoke, in the county of Roanoke and State of Virginia, have invented certain new and useful Improvements in Lock-Nuts, of which the following is a specification.

This invention relates to lock nuts and the object thereof is to provide a nut which may be readily and positively locked upon a bolt by distorting the thread of the bolt, the nut at the same time being so formed as to reduce the possibility of its being locked against a wrong direction of rotation and also so that it may be removed without the necessity of splitting the nut. Another object is to provide such a nut of maximum strength and that may be manufactured without greatly increased cost.

With these general objects in view the invention consists of the peculiar formation of a nut as will be herein described and claimed.

In the drawings, Figure 1 is a plan view of an embodiment of the nut of my invention and Fig. 2 an isometric projection of the same as applied to a bolt. Fig. 3 is a side elevational view of the detached nut and Fig. 4 a side elevational view of a portion of a bolt showing how a thread thereof is to be displaced for engagement with a portion of the nut which is especially fashioned for that purpose.

Referring now to these drawings, 1 represents a bolt or the like having a threaded portion 2. The nut 3 may be of any of the commercial forms, a hexagonal nut being shown in the drawings.

The nut is provided with the customary pierced and internally screw-threaded opening 4. In the upper face of the nut there are provided a series of recesses 5 which extend radially of the nut from the hole 4 to the outer edge of the nut. This recess is formed with a vertical locking face 6 which occupies a plane 7 which is coincident with the axis of the screw. From the bottom of the locking face 6 the bottom face 8 of the recess 5 progresses in an upwardly inclined path against the direction of rotation for tightening the nut to the original upper face of the nut, the locking face 6 thus being disposed in such manner as to present an abutment against which a displaced thread of the bolt will seat as at 9 when the nut is rotated for removal. The radial and vertical disposition of the locking face provides that the displaced thread will engage it positively and at substantially right angles, it being the intention that the thread of the bolt shall be broken or sheared entirely through by the application of a chisel or the like, at the same time being bent downward about one half of its pitch to bring the broken end into positive abutting engagement with the locking face, and the inclined bottom of the recess provides that no other part of the nut will be presented as a suitable abutment, hence the unskilled workman or laborer will have no opportunity to displace the thread of the bolt against a wrong abutment or in other words, lock the nut positively against further tightening and leave it relatively free to become loose.

The inclined bottom of the recess engages the displaced thread at an acute angle when the nut is turned in the direction for further tightening and thus the nut may be drawn up after being locked. Also, by so drawing up the nut the distorted thread will be straightened and the nut may then be removed. The tapered bottom of the recess also requires the removal of less material of the nut and provides a nut of greater strength for the purpose.

After being once locked the nut may be retightened and locked at a new position. Also one or more of the recesses may be provided so as to give one or more locking faces as desired.

Thus I have produced a nut adapted to be positively locked upon a bolt. The nut so formed is economical in that it can be as readily manufactured as the ordinary nut. And while I am aware that various other attempts have been made to lock nuts upon bolts by providing pockets, spurs, locking faces, etc., upon the nut, yet in my present invention I have provided a nut having material advantages over all others of which I am aware. And having described the features of my invention, I claim:

A pierced and internally screw-threaded nut, having at least one recess in its upper face extending from the hole in the nut to the outer edge of the same, the said recess embodying a vertical locking face occupying a plane coincident with the axis of the screw and extending from the outer periphery of the nut to the bore thereof, and having also a bottom face which progresses from the bottom of the locking face in an upwardly inclined path to the original upper face of the nut, a bolt exteriorly threaded to receive the said nut, and means for locking said nut upon the bolt, said means consisting of displacing the thread of the bolt within the recess of the nut for substantially one-half of a thread pitch in such manner as to bring the displaced thread of the bolt out of registry with the thread opening in the locking face, the said recess being so disposed in the nut that the displaced thread of the bolt will positively engage the locking face as described when the nut is turned in the direction for removal and such displaced thread will engage the inclined bottom of the recess at an acute angle upon rotation in the direction for tightening, the said recess being so formed that no surface thereof except the said locking face will present an abutment for the positive engaging of the displaced thread of the bolt.

In testimony whereof I affix my signature.

FRANK A. LYNCH.

Copies of this patent may be obtained for five cents each, by addressing the "Commissioner of Patents, Washington, D. C."